United States Patent
Gamroth et al.

(10) Patent No.: US 10,908,570 B2
(45) Date of Patent: Feb. 2, 2021

(54) BUILDING DEVICES WITH COMMUNICATION SUBSYSTEMS INDEPENDENTLY POWERED BY POWER OVER ETHERNET (POE)

(71) Applicant: Johnson Controls Technology Company, Auburn Hills, MI (US)

(72) Inventors: Timothy C. Gamroth, Dousman, WI (US); Yingchun Xu, Glendale, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 13 days.

(21) Appl. No.: 15/956,914

(22) Filed: Apr. 19, 2018

(65) Prior Publication Data
US 2018/0314219 A1 Nov. 1, 2018

Related U.S. Application Data

(60) Provisional application No. 62/491,760, filed on Apr. 28, 2017.

(51) Int. Cl.
*G05B 19/042* (2006.01)
*G06F 1/26* (2006.01)
(52) U.S. Cl.
CPC .............. *G05B 19/042* (2013.01); *G06F 1/26* (2013.01); *G05B 2219/2614* (2013.01)
(58) Field of Classification Search
CPC ................................ G06F 1/26; G05B 19/042
(Continued)

(56) References Cited

U.S. PATENT DOCUMENTS 7,873,057 B2  1/2011  Robitaille et al.
8,428,054 B2* 4/2013  Miller ..................... H04L 12/10
                                                            370/360
(Continued)

FOREIGN PATENT DOCUMENTS

CN    101063884 A   10/2007
CN    101707393 A    5/2010
(Continued)

OTHER PUBLICATIONS

Office Action on CN 201810394663.4, dated Sep. 18, 2020, 10 pages with English translation.

*Primary Examiner* — Mohammad Ali
*Assistant Examiner* — Joshua T Sanders
(74) *Attorney, Agent, or Firm* — Foley & Lardner LLP

(57) ABSTRACT

A power over Ethernet (PoE) device system for a building including building devices connected together and to a PoE source via a network. The PoE source is configured to provide each of the building devices with PoE. A first building device of the building devices includes a communication subsystem circuit configured to receive the PoE from the PoE source via one of the building devices, power the communication subsystem circuit using the PoE received from the PoE source via the one of the building devices, and communicate with the PoE source and the building devices via the network. The first building device includes a functional subsystem circuit configured to power the functional subsystem circuit using power received from a permanent power source of the building and control an environmental condition of the building using the power received from the permanent power source of the building.

20 Claims, 8 Drawing Sheets

(58) Field of Classification Search
USPC .......................................................... 700/276
See application file for complete search history.

(56) References Cited

U.S. PATENT DOCUMENTS

| | | |
|---|---|---|
| 8,705,341 B2 | 4/2014 | Robitaille et al. |
| 2005/0080516 A1 | 4/2005 | Pincu et al. |
| 2007/0025240 A1 | 2/2007 | Snide |
| 2008/0100141 A1 | 5/2008 | Lee et al. |
| 2009/0217065 A1* | 8/2009 | Araujo, Jr. ............ G06F 1/3203 713/320 |
| 2013/0301495 A1 | 11/2013 | Miller |
| 2014/0129854 A1 | 5/2014 | Diab |
| 2014/0139014 A1 | 5/2014 | Sontag et al. |
| 2014/0241168 A1* | 8/2014 | Merlin .................. H04L 1/0003 370/241 |
| 2014/0265550 A1 | 9/2014 | Milligan et al. |
| 2016/0183351 A1 | 6/2016 | Snyder et al. |

FOREIGN PATENT DOCUMENTS

| | | |
|---|---|---|
| CN | 103733148 A | 4/2014 |
| CN | 104020726 A | 9/2014 |
| CN | 104579698 A | 4/2015 |
| CN | 205070585 U | 3/2016 |
| EP | 2 202 914 A1 | 6/2010 |
| EP | 2 795 810 A2 | 10/2014 |

\* cited by examiner

BUILDING DEVICES WITH COMMUNICATION SUBSYSTEMS INDEPENDENTLY POWERED BY POWER OVER ETHERNET (POE)

CROSS-REFERENCE TO RELATED PATENT APPLICATION

This application claims the benefit of and priority to U.S. Provisional Patent Application No. 62/491,760 filed Apr. 28, 2017, the entire disclosure of which is incorporated by reference herein.

BACKGROUND

The present disclosure relates generally to powering building devices of systems such as heating, ventilation, and air conditioning (HVAC) systems. The present disclosure relates more particularly to powering building devices via power over Ethernet (PoE).

A building can include multiple devices located throughout the building. These building devices can be powered via PoE. A building device can communication and receive power via PoE via an Ethernet connection. In this regard, the building device may not require a permanent power source, e.g., a direct AC or DC power source, since the building device can be powered via an Ethernet connection supplying PoE. However, some building devices may require an amount of power greater than an amount of power that can be supplied via PoE. For example, some HVAC devices can be configured to perform environmental control of the building. Performing the environmental control may require an amount of power greater than an amount of power that can be supplied to the HVAC devices via PoE.

SUMMARY

One implementation of the present disclosure is a power over Ethernet (PoE) device system for a building. The system includes building devices connected together and to a PoE source via a network, where the PoE source is configured to provide each of the building devices with PoE. A first building device of the building devices includes a communication subsystem circuit configured to receive the PoE from the PoE source via one of the building devices, power the communication subsystem circuit using the PoE received from the PoE source via the one of the building devices, and communicate with the PoE source and the building devices via the network. The first building device includes a functional subsystem circuit configured to power the functional subsystem circuit using power received from a permanent power source of the building and control an environmental condition of the building using the power received from the permanent power source of the building.

In some embodiments, the network is an Ethernet daisy chain, where the building devices are connected to the PoE source via the Ethernet daisy chain. In some embodiments, the communication subsystem circuit is configured to continue to communicate with the PoE source and/or the building devices via the network even if the permanent power source has failed since the communications subsystem is powered using the PoE.

In some embodiments, the communication subsystem circuit includes a memory device. In some embodiments, the communication subsystem circuit is configured to receive a software update for the first building device via the network, store the software update in the memory device of the communication subsystem circuit in response to determining that the functional subsystem circuit is not active due to the permanent power source failing to power the functional subsystem circuit, retrieve the software update from the memory device of the communication subsystem circuit in response to determining that the functional subsystem circuit is active, and provide, in response to determining that the functional subsystem circuit is active, the retrieved software update to the functional subsystem circuit for the functional subsystem circuit to install.

In some embodiments, the communications subsystem circuit includes a memory device. In some embodiments, the communication subsystem circuit is configured to receive a software update for the one of the building devices via the network, store the software update in the memory device of the communication subsystem circuit in response to determining that a functional subsystem circuit of the one of the building devices is not active due to another permanent power source failing to power a functional subsystem circuit of the one of the building devices, retrieve the software update from the memory device of the communication subsystem circuit in response to determining that the functional subsystem circuit of the one of the building devices is active, and communicate, in response to determining that the functional subsystem circuit of the one of the building devices is active, the retrieved software update via the network to the one of the building devices to install via the functional subsystem circuit of the one of the building devices.

In some embodiments, the communication subsystem circuit is configured to transmit or receive data via the network based on a first communication setting, determine that the one of the building devices is not active, and transmit or receive data via the network based on a second communication setting, where the second communication setting causes the communications subsystem circuit to transmit or receive data via the network at rates less than rates that the communication subsystem circuit is configured to transmit or receive data via the network based on the first communication setting.

In some embodiments, each of the building devices include a functional subsystem circuit configured to control the environmental condition of the building, where each functional subsystem circuit is configured to be powered using a particular permanent power source. In some embodiments, each of the building devices includes a communication subsystem circuit, where each communication subsystem circuit is configured to receive the PoE from the PoE source and power the communication subsystem circuit using the PoE received from the PoE source.

In some embodiments, the functional subsystem circuits of the building devices are configured to collectively draw more power than a maximum power amount that the PoE source is capable of providing to the building devices. In some embodiments, the communication subsystem circuits of the building devices are configured to collectively draw less than the maximum power amount.

In some embodiments, the functional subsystem circuits of the building devices are configured to each draw more power than a maximum power amount that the PoE source is capable of providing to the building devices. In some embodiments, the communication subsystem circuits of the building devices are configured to each draw less than the maximum power amount.

In some embodiments, the network is a ring network, where the building devices and the PoE source are connected in the ring network. In some embodiments, a second building device of the building devices is directly connected to the PoE source via the network and is connected to the first building device via the network. In some embodiments, a third building device of the building devices is directly connected to the PoE source via the network and is connected to the first building device via the network.

In some embodiments, the communication subsystem circuit of the first building device is configured to receive the PoE from the PoE source via the second building device, power the communication subsystem circuit using the PoE received from the PoE source via the second building device, receive the PoE from the PoE source via the third building device in response to determining that the first building device has not received the PoE from the PoE source via the first building device, and power the communication subsystem circuit using the PoE received from the PoE source via the third building device in response to determining that the first building device has not received the PoE from the PoE source via the second building device.

In some embodiments, the first building device includes a PoE switch circuit. In some embodiments, the communication subsystem circuit is configured to cause the communication subsystem circuit to be powered using power received from the PoE source via the second building device or using power received from the PoE source via the third building device by controlling the PoE switch circuit.

Another implementation of the present disclosure is a first building device of a power over Ethernet (PoE) system including a communication subsystem circuit configured to receive PoE from a PoE source via one of building devices of a network, where the PoE source is configured to provide each of the building devices with PoE, where the building devices are connected to the PoE source via the network, power the communication subsystem using the PoE received from the PoE source via the one of the building devices, and communicate with the PoE source and the building devices via the network. The first building device includes a functional subsystem circuit configured to power the functional subsystem circuit using power received from a permanent power source of the building and control an environmental condition of the building using the power received from the permanent power source of the building.

In some embodiments, the network is an Ethernet daisy chain, where the building devices and the first building device are connected to the PoE source via the Ethernet daisy chain.

In some embodiments, the communication subsystem circuit includes a memory device. In some embodiments, the communication subsystem circuit is configured to receive a software update for the first building device via the network, store the software update in the memory device of the communication subsystem circuit in response to determining that the functional subsystem circuit is not active due to the permanent power source failing to power the functional subsystem circuit, retrieve the software update from the memory device of the communication subsystem circuit in response to determining that the functional subsystem circuit is active, and provide, in response to determining that the functional subsystem circuit is active, the retrieved software update to the functional subsystem circuit for the functional subsystem circuit to install.

In some embodiments, the communication subsystem circuit includes a memory device, where the communication subsystem circuit is configured to receive a software update for the one of the building devices via the network, store the software update in the memory device of the communication subsystem circuit in response to determining that a functional subsystem circuit of the one of the building devices is not active due to another permanent power source failing to power a functional subsystem circuit of the one of the building devices, retrieve the software update from the memory device of the communication subsystem circuit in response to determining that the functional subsystem circuit of the one of the building devices is active, and communicate, in response to determining that the functional subsystem circuit of the one of the building devices is active, the retrieved software update via the network to the one of the building devices to install via the functional subsystem circuit of the one of the building devices.

In some embodiments, the network is a ring network, where the building devices and the PoE source are connected in the ring network. In some embodiments, a second building device of the building devices is directly connected to the PoE source via the ring network and is connected to the first building device via the ring network. In some embodiments, a third building device is directly connected to the PoE source via the network and is connected to the first building device via the ring network.

In some embodiments, the communication subsystem circuit of the first building device is configured to receive the PoE from the PoE source via the second building device, power the communication subsystem circuit using the PoE received from the PoE source via the second building device, receive the PoE from the PoE source via the third building device in response to determining that the first building device has not received the PoE from the PoE source via the first building device, and power the communication subsystem circuit using the PoE received from the PoE source via the third building device in response to determining that the first building device has not received the PoE from the PoE source via the second building device.

In some embodiments, the communication subsystem circuit includes a PoE switch circuit. In some embodiments, the communication subsystem circuit is configured to cause the communication subsystem circuit to be powered using power received from the PoE source via the second building device or using power received from the PoE source via the third building device by controlling the PoE switch circuit.

Another implementation of the present disclosure is a method for controlling a first building device of a power over Ethernet (PoE) system of a building. The method includes receiving, by a communication subsystem circuit of the first building device, PoE from a PoE source via one of building devices of the network, where the PoE source is configured to provide each of the building devices with PoE, where the building devices are connected to the PoE source via a network. The method includes powering, by the communication subsystem circuit, the communication subsystem using the PoE of the PoE source received from the PoE source via the one of the building devices, communicating, by the communication subsystem circuit, with the PoE source and the building devices via the network, powering, by a functional subsystem circuit of the first building device, the functional subsystem circuit using power received from a permanent power source of the building, and controlling, by the functional subsystem circuit, an environmental condition of the building using the power received from the permanent power source of the building.

In some embodiments, the network is a ring network. In some embodiments, the building devices and the PoE source are connected in the ring network. In some embodiments, a second building device of the building devices is directly connected to the PoE source via the ring network and is connected to the first building device via the ring network. In some embodiments, a third building device is directly connected to the PoE source via the network and is connected to the first building device via the ring network. In some embodiments, the method includes receiving, by the communication subsystem circuit, the PoE from the PoE source via the second building device, powering, by the communication subsystem circuit, the communication subsystem circuit using the PoE received from the PoE source via the second building device, receiving, by the communication subsystem circuit, the PoE from the PoE source via the third building device in response to determining that the first building device has not received the PoE from the PoE source via the first building device, and powering, by the communication subsystem circuit, the communication subsystem circuit using the PoE received from the PoE source via the third building device in response to determining that the first building device has not received the PoE from the PoE source via the second building device.

DETAILED DESCRIPTION

Overview

Figure 1:
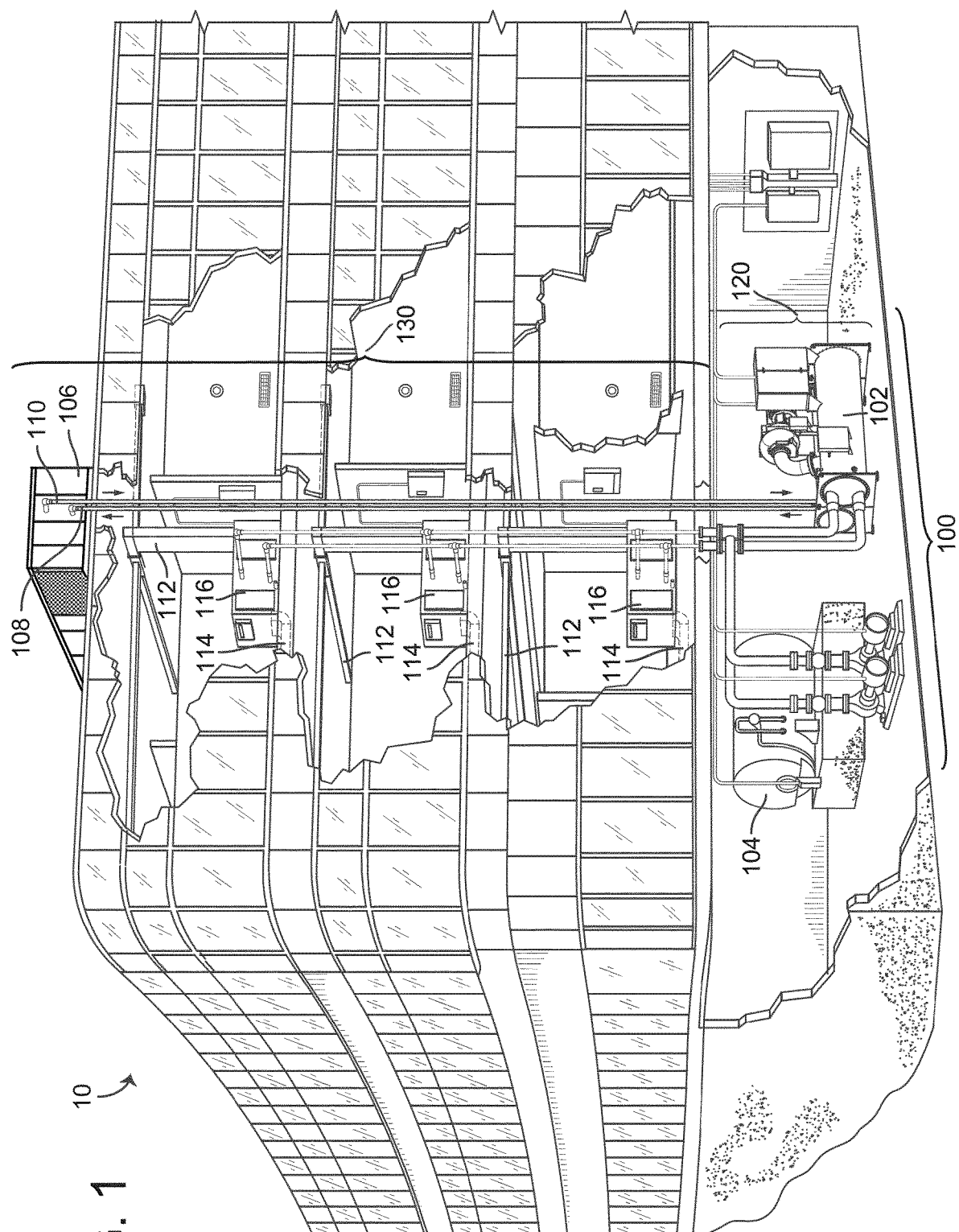
FIG. 1 is a drawing of a building equipped with a HVAC system, according to an exemplary embodiment.

Referring now to the FIGURES generally, systems and methods for building devices that have independently powered subsystems are shown, according to various exemplary embodiments. The building devices shown in the figures are powered via power over Ethernet (PoE) in addition to a permanent power source. In this regard, each building device may have two separate power sources. In some embodiments described herein, the permanent power source powers one subsystem of the building device while the PoE power source powers a different subsystem of the building device. For example, a building device may have a functional system including and/or controlling various actuators (e.g., a compressor, a valve, a damper, an electric motor, etc.) that have components that draw a large amount of power and/or may require a large amount of power to control. This large amount of power may be a power draw greater than the maximum power draw that PoE can supply to the building device. However, a communication subsystem of the building device may draw an amount of power that PoE can supply to the building device. In this regard, the building device may power the functional subsystem via the permanent power source and power a communication system of the building device via PoE.

In some buildings, building devices may be connected via an Ethernet daisy chain. The daisy chain may include a PoE source device (e.g., power sourcing equipment (PSE)) that provides PoE to the daisy chained building devices (e.g., powered devices (PDs)). In some embodiments, there is an inherent limit (e.g., power budget) to the power available from the source device. In some embodiments, the amount of power provided by the source device is insufficient to fully power one (i.e., or all) of the building devices (e.g., the functional systems of the building device and/or devices). Further, even if the source device provides power levels sufficient for powering all of the subsystems of a single building device, the power provided by the PoE source device may be insufficient to fully power multiple building devices in the daisy chain.

In some embodiments, the functional subsystem of the building device can be powered via a permanent power source while the communication subsystem can be powered via PoE. By only powering the communication subsystems of the building devices via PoE, the power sourced from the source device can be minimized such that the PoE source device can power the communication subsystems of a large number of building devices. In some embodiments, the PoE source device can power more than 30 building devices via PoE when only powering the communication subsystems of the building devices. In some embodiments, when PoE+ is used, more than 60 building devices can have their communication subsystems powered via PoE+. In these cases, all of the building devices may continue to have network connectivity even when one of the building devices goes offline and/or their permanent power source is removed since the communication subsystem of the building device may continue to be powered even when the building device is not fully powered.

The string of daisy chained Ethernet devices may be subject to failure if there is a building device upstream in the daisy chain that has lost power from its permanent power source. However, if each of the building devices in the daisy chain can be configured to power their communication subsystems via PoE rather than the permanent power source, the building devices of the daisy chain may not go offline downstream when one of the building devices loses its permanent power source or otherwise experiences a power failure. For example, if one of the building devices has lost power from its permanent power source, its independently powered communications subsystem powered via PoE can allow the building device to continue to communicate via a network (e.g., a daisy chain) even if the permanent power source has failed or a functional subsystem of the building device has failed. This can create an intolerance to many power failures that building devices of a network may face.

Building Management System and HVAC System

Figure 2:
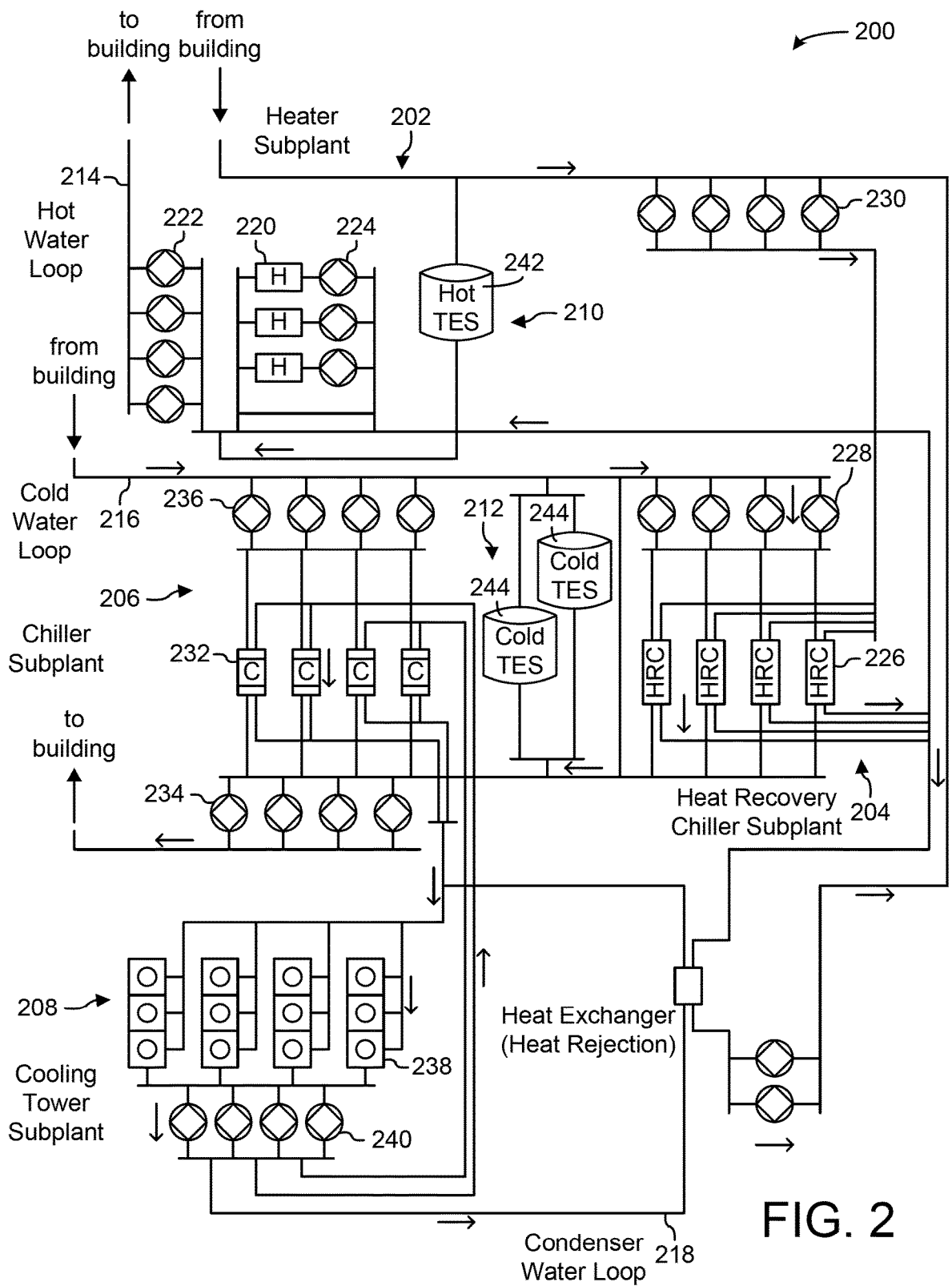
FIG. 2 is a block diagram of a waterside system that may be used in conjunction with the building of FIG. 1, according to an exemplary embodiment.
Figure 3:
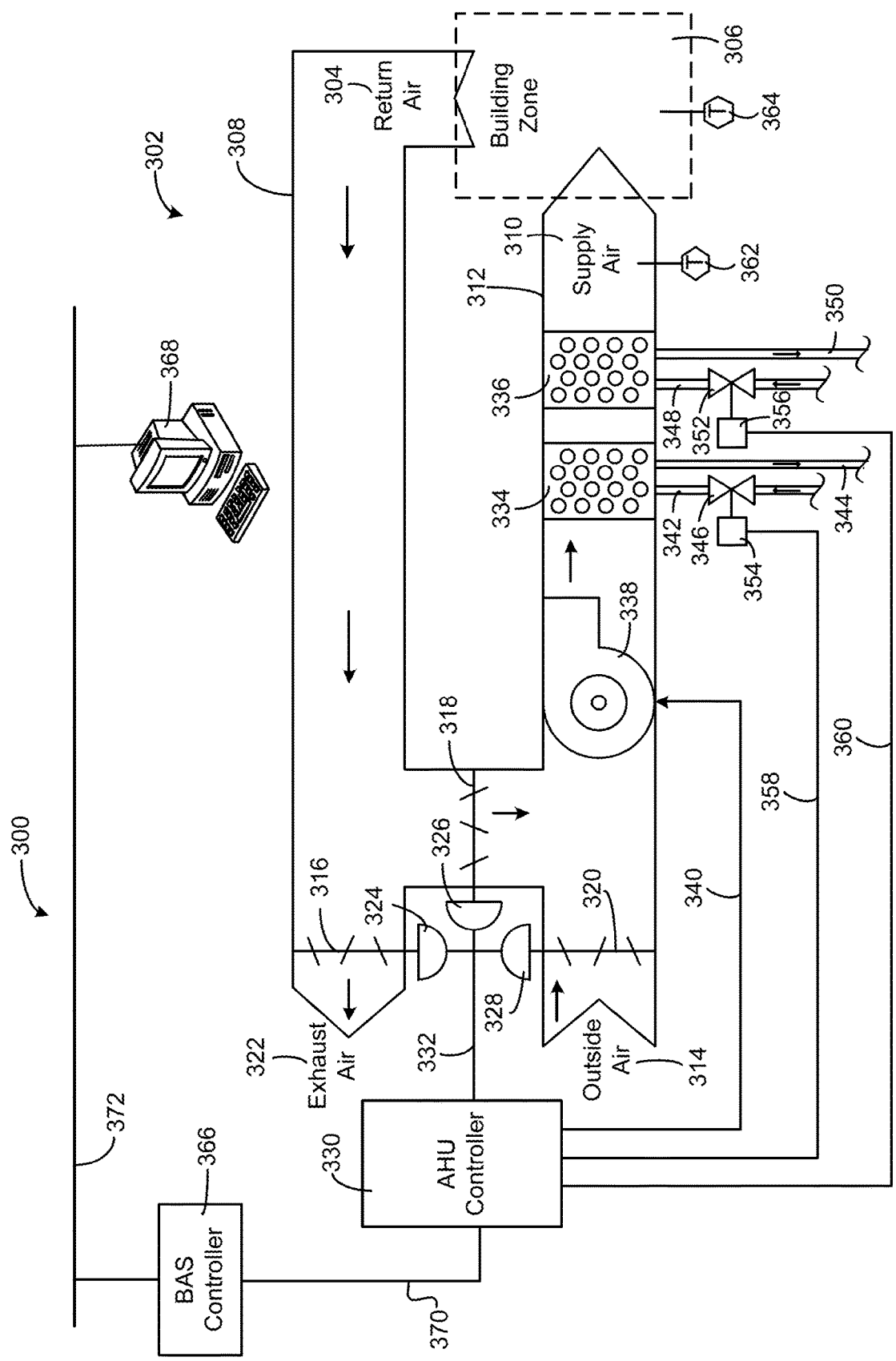
FIG. 3 is a block diagram of an airside system that may be used in conjunction with the building of FIG. 1, according to an exemplary embodiment.

Referring now to FIGS. 1-3, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices, or any combination thereof.

The BMS that serves building 10 includes an HVAC system 100. HVAC system 100 can include multiple HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a multiple subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Building Devices

Figure 4:
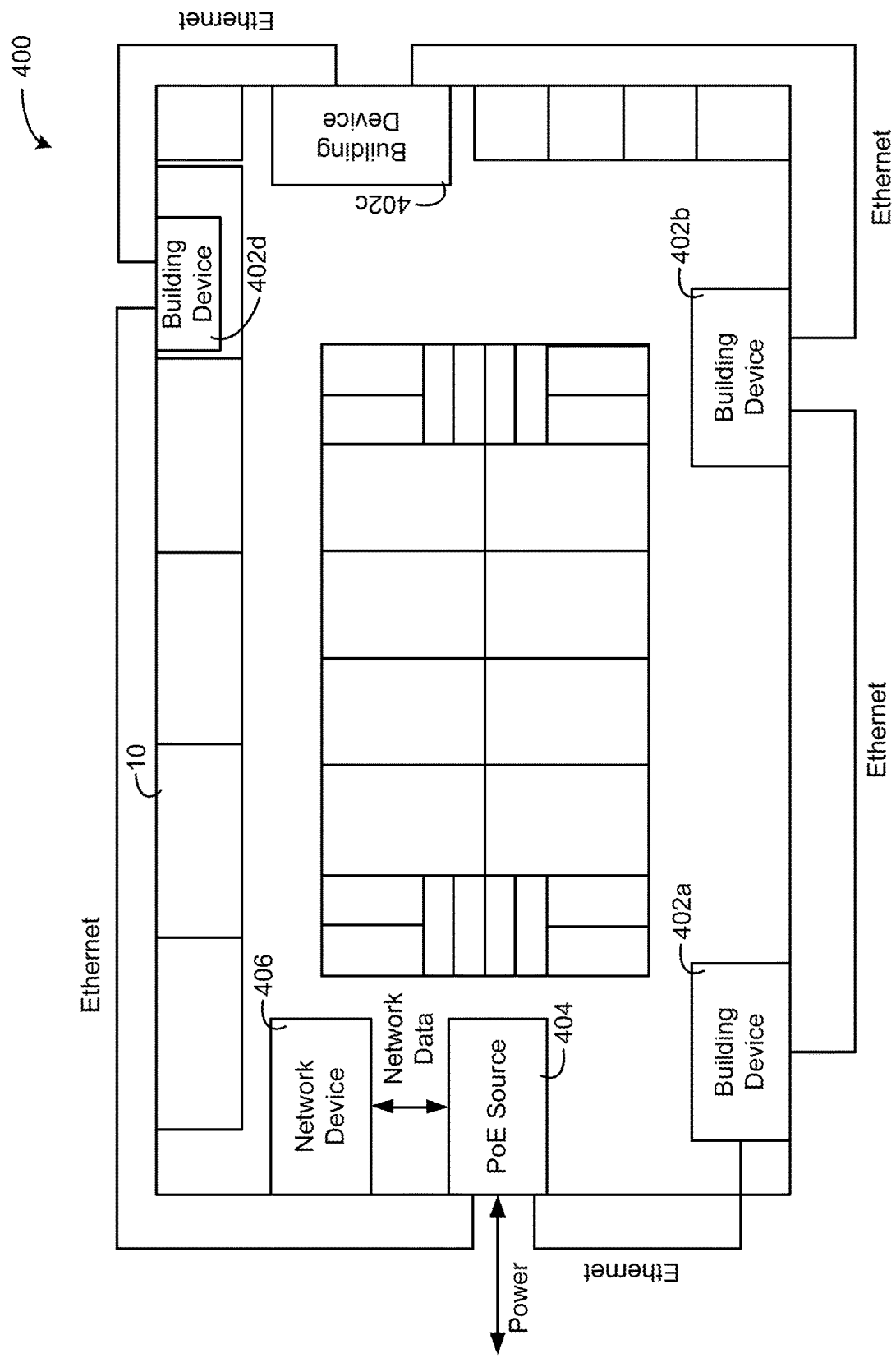
FIG. 4 is a block diagram of a system of building devices in the building of FIG. 1 being powered via power over Ethernet (PoE), according to an exemplary embodiment.

Referring now to FIG. 4, a system 400 inside of building 10 of FIG. 1 is shown to include a plurality of building devices, a PoE source, and a network device, according to an exemplary embodiment. In FIG. 4, one particular floor of building 10 is shown. In FIG. 4, building devices 402a-d are shown. In various embodiments, building devices 402a-d are located on the same floor of building 10, on the rooftop of building 10, in the basement of building 10, and/or on any other floor or location within building 10. Network device 406 is shown to be located in building 10. Network device 406 may be any network device such as a network switch, a router, a modem, and/or any other device that facilitates a connection to a wide area network (WAN) (e.g., the Internet) or another building network.

PoE source 404 is shown to be connected to network device 406. PoE source 404 is shown to receive power in addition to transmit and receive network data to/from network device 406. PoE source 404 may be power sourcing equipment (PSE) for PoE. PoE source 404 is further shown to be connected via Ethernet to building device 402a and building device 402c. PoE source 404 can be configured to supply PoE to all of building devices 402a-d. PoE source 404 may include multiple power injectors, midspans, and/or PoE network switches and/or other circuits configured to facilitate PoE to building devices 402a-d. In various embodiments, network device 406 and PoE source 404 are the same device, that is, are a combination of a network device (e.g., router, network switch, etc.) and a PoE source (e.g., power injector). PoE source 404 can be configured to facilitate PoE Alternative A (e.g., transmitting power and data over the same wires of an Ethernet cable) and/or PoE Alternative B (transmitting power and data over separate wires of an Ethernet cable). PoE source 404 can be configured to facilitate 802.3af (e.g., PoE), 802.3at (e.g., PoE+), 802.3bt (e.g., 4PPoE), and/or 802.3bt.

Building devices 402a-d are shown to be connected in a daisy chain in building 10. More specifically, building devices 402a-d are shown to be connected in a closed daisy chain, a ring network. Building devices 402a-d may be HVAC devices (e.g., chiller 102, VAVs 116, boiler 104, AHU 106, a thermostat, a humidity sensor, a temperature sensor, a building controller, etc.), a security device (e.g., a security camera, access control systems, etc.), and/or emergency equipment (e.g., smoke detectors, carbon monoxide sensors, fire panels, etc.). Building devices 402a-d may be PoE powered devices (PDs) of system 400. Each of the building devices 402a-d can be configured to receive power from a previous device in the daisy chain and/or a subsequent device in the daisy chain. For example, building device 402a may receive PoE power from PoE source 404 and/or from building device 402b. Similarly, building device 402c can be configured to receive PoE from building device 402b and/or from building device 402d.

Figure 5:
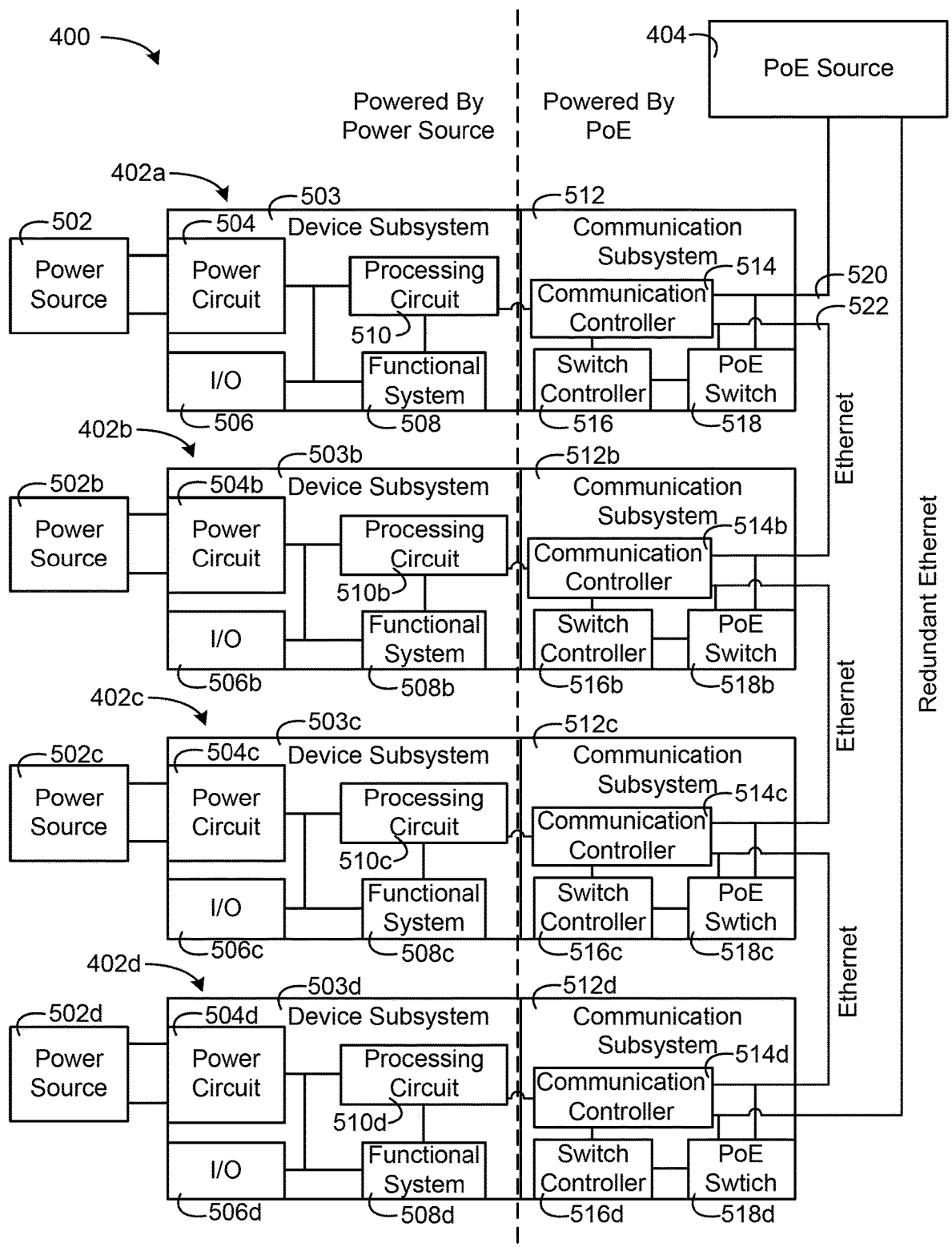
FIG. 5 is a block diagram of the system of FIG. 4 in greater detail, according to an exemplary embodiment.

Referring now to FIG. 5, a block diagram of system 400 is shown in further detail, according to an exemplary embodiment. Building devices 402a-d as described with reference to FIG. 4 are shown in FIG. 5. In FIG. 5, building device 402a is described in detail; the description of building device 402a is applicable to building devices 402b-d. Building device 402a is shown to include two subsystems, device subsystem 503 and communication subsystem 512. Device subsystem 503 is shown to be powered via power source 502. Communication subsystem 512 is shown to be powered via PoE. Device subsystem 503 may be a device subsystem circuit including processors, memory devices, switches, and/or circuit components configured to communicate with the devices 402b-d and the PoE source 404 via the communication subsystem 512, generate control decisions, power the device subsystem 503 via a permanent power source, and/or control environmental conditions of building 10. Communication subsystem 512 may be a device subsystem circuit including processors, memory devices, switches, and/or circuit components configured to communicate with devices 402b-d and PoE source 404 via Ethernet connections 520 and 522, receive PoE from PoE source 404 (e.g., via the building devices 402b-d), and power the communication subsystem 512 via PoE.

PoE source 404 is shown to be connected to building devices 402a-d via Ethernet connections, e.g., Ethernet cables. The Ethernet cables may be a Cat5 cable, a Cat5e cable, a Cat6 cable, and/or any other type of Ethernet cable. PoE source 404 may provide building devices 402a-d with PoE. PoE source 404 may provide building devices 402a-d with DC power. The DC voltage provided by PoE source 404 may be 48 VDC. In FIG. 4, PoE source 404 includes a redundant Ethernet connection. The redundant Ethernet connection allows for building devices 402a-d, connected in a ring network, to receive PoE from a previous building device and/or a subsequent building device. This complete loop of the PoE source 404 and building devices 402a-d forms a ring network, e.g., a daisy chain network where the end devices of the daisy chain are connected.

In various embodiments, the maximum power that PoE source 404 can provide is a predefined amount. This amount may only be enough to power communication subsystem 512 and/or communications subsystems 512b-d but is not enough to power device subsystem 503 and/or communication subsystem 512 and/or device subsystems 503b-d and communication subsystems 512b-d of building devices 503b-d. In some embodiments, communication subsystem 512 is and/or includes one or more ASICs. The ASICs may be low power circuits that perform some and/or all of the functionality of communication subsystem 512. When communication subsystem 512 has and/or is an ASIC, the power draw of communication subsystem 512 may be greatly reduced.

Communication subsystem 512 can include one or more processing circuits, power circuits, and/or circuit components. The processing circuits may be the same as and/or similar to processing circuit 510 as described with reference to FIG. 6. Communication subsystem 512 can be configured to receive PoE from PoE source 404. Communication subsystem 512 can further be configured to perform network communication with building devices 402b-d in addition to communicating to other networks that may be available based on network device 406. Communication subsystem 512 is shown to include communication controller 514, switch controller 516, and PoE switch 518. Communication subsystem 512 can be configured to facilitate all communication via Ethernet connections 520 and 522. Communication controller 514 can include one or more transformers, Ethernet connectors, processing circuits, ASICS, and/or microprocessors configured to facilitate communicate with other devices and/or networks via Ethernet connections. Communication controller 514 may include integrated circuits (ICs) such as an LTC4279, PM8801, 78Q8430, and/or any other commercially available IC that can be used for Ethernet communication and/or PoE.

Communication subsystem 512 can be configured to power the components of communication subsystem 512 via PoE. In some embodiments, communication subsystem 512 includes one or more power circuits for powering communication subsystem 512. In some embodiments, the power circuits are integrated circuits such as an LM5070 or other industrial integrated circuit configured to facilitate power via PoE. Communication subsystem 512 is shown to include switch controller 516 and PoE switch 518. Switch controller 516 may be a logic circuit, a processing circuit, and/or any other circuit or device that can be configured to control the functionality of communication subsystem 512. PoE switches 518b-d may be the same and/or similar to PoE switch 518. Switch controllers 516b-d may be the same as and/or similar to switch controller 516.

Switch controller 516 may be a software component of a processing circuit of communication subsystem 512 (e.g., communication controller 514), may be an analog and/or digital switch circuit, and/or may be a processing circuit, ASCI, microprocessor, etc. Switch controller 516 can be configured to activate and/or deactivate PoE switch 518. Switch controller 516 can be configured to cause communication subsystem 512 to be powered via Ethernet connection 520 and/or Ethernet connection 522. In this regard, switch controller 516b can be configure to determine if one of Ethernet connection 520 and/or Ethernet connection 522 is not active and/or does not have PoE available. In this regard, switch controller 516 can be configured to select one of Ethernet connection 522 and Ethernet connection 520 to power communication subsystem 512 via PoE based on which Ethernet connections have PoE available.

Device subsystem 503 is shown to include processing circuit 510, functional system 508, I/O 506, and power circuit 504. Processing circuit 510 can be powered by one and/or both of power circuit 504 and/or PoE via communication subsystem 512. Power circuit 504 is shown to be connected to power source 502. Power source 502a may be one or a combination of a 24 VAC power source, a 120 VAC power source, a 240 VAC power source, and/or any other power source. Power sources 502b-d may be the same as and/or similar to power sources 502 and may each respectively power building devices 402b-d. Functional systems 508b-d may be the same as and/or similar to functional system 508.

In some embodiments, power circuit 504 includes one or more rectifier circuits, filtering circuits, transformers, etc. Power circuit 504 can be configured to power device subsystem 503 and/or communication subsystem 512. Power circuit 504 can be configured to power processing circuit 510, I/O 506, and/or functional system 508. Power circuits 504b-d may be the same as and/or similar to power circuit 504. Processing circuit 510 can be and/or include any processor, ASIC, microprocessor etc. and memory such as RAM, FLASH, etc. Processing circuit 510 can be configured to communicate with building devices 502b-d and/or another network via communication controller 514. Further, processing circuit 510 can be configured to generate control signals for functional system 508 and/or I/O 506 and/or can receive data and/or signals from I/O 506 and/or functional system 508. Processing circuits 510b-d may be the same as and/or similar to processing circuit 510. Communication controllers 514b-d may be the same as and/or similar to communication controller 514. Furthermore, I/Os 506b-d may be the same as and/or similar to I/O 506.

Functional system 508 may include physical components such as actuators. Functional system 508 may include circuits, circuit boards, motors, solenoids, and/or other components necessary for operating the actuator. In some embodiments, function system 508 may be one of a compressor, a motor, a valve, a fan, a damper, and/or any other components or system. I/O 506 can be an interface for connecting equipment and/or devices to building device 402a. In some embodiments, I/O includes one or more input/output circuits that may include relays, triacs, voltage dividers, etc. In one example, I/O circuit may include one or more outputs for controlling the speed of a fan, the speed of a compressor, turning a compressor on and/or off, opening and/or closing a valve, etc. Further, I/O 506 may include one or more inputs such as positional feedback of a valve, a temperature for a temperature sensor, etc. I/O 506 can be powered by power circuit 504*b*.

Figure 6:
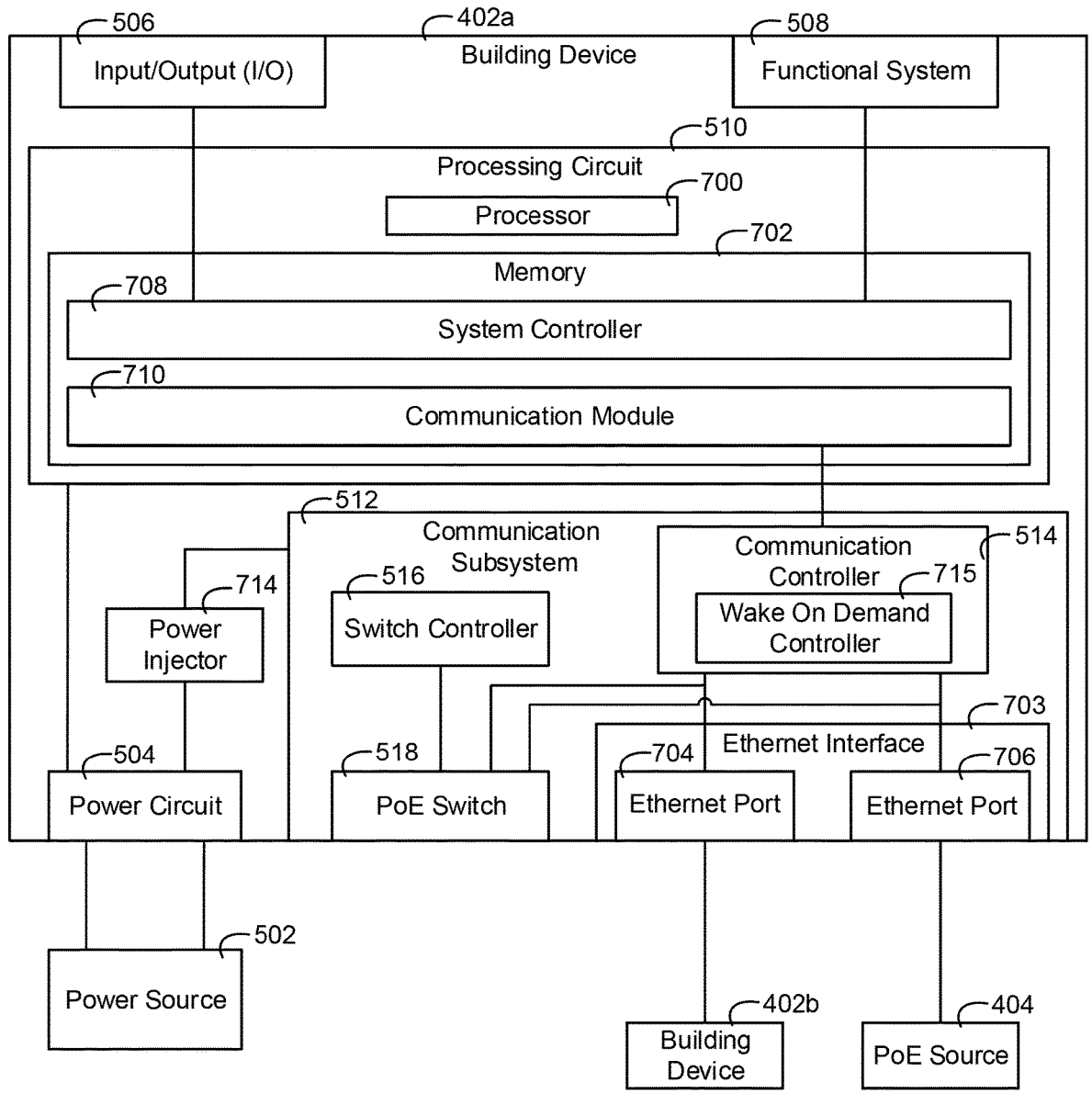
FIG. 6 is a block diagram of one of the building devices of FIG. 4 in greater detail, according to an exemplary embodiment.

Referring now to FIG. 6, a building device 402*a* is shown in greater detail, according to an exemplary embodiment. Communication subsystem 512 and device subsystem 503 as described with reference to FIG. 5 are described in further detail in FIG. 6. The components of device subsystem 503 as described with reference to FIG. 5 are I/O 506, functional system 508, processing circuit 510, power injector 714, and power circuit 504. The components of communication subsystem 512 as described with reference to FIG. 5 are switch controller 516, PoE switch 518, communication controller 514 and Ethernet interface 703.

Building device 402*a* is shown to include processing circuit 510. Processing circuit 510 is shown to include processor 700 and memory 702. Processor 700 can be a general purpose or specific purpose processor, an application specific integrated circuit (ASIC), one or more field programmable gate arrays (FPGAs), a group of processing components, or other suitable processing components. Processor 700 may be configured to execute computer code and/or instructions stored in memory 702 or received from other computer readable media (e.g., CDROM, network storage, a remote server, etc.).

Memory 702 can include one or more devices (e.g., memory units, memory devices, storage devices, etc.) for storing data and/or computer code for completing and/or facilitating the various processes described in the present disclosure. Memory 702 can include random access memory (RAM), read-only memory (ROM), hard drive storage, temporary storage, non-volatile memory, flash memory, optical memory, or any other suitable memory for storing software objects and/or computer instructions. Memory 702 can include database components, object code components, script components, or any other type of information structure for supporting the various activities and information structures described in the present disclosure. Memory 702 can be communicably connected to processor 700 via processing circuit 510 and can include computer code for executing (e.g., by processor 700) one or more processes described herein.

Memory 702 is shown to include system controller 708 and communication module 710. System controller 708 can be configured to generate control signals for functional system 508 and/or I/O 506. In some embodiments, a device (e.g., a motor, a compressor, an actuator, a valve, a damper, etc.) is connected to I/O 506. In this regard, system controller 708 can be configured to generate control signals for the device connected to I/O 506. In some embodiments, system controller 708 can be configured to generate control signals for functional system 508. Functional system 508 may be one of a fan, a compressor, a valve, a damper, and/or any other kind of actuator. System controller 708 can be configured to generate control signals for the functional system 508. In some embodiments, system controller 708 may use P controllers, PI controllers, PID controllers, model predictive controllers, and/or any other kind of controller to generate control signals for I/O 506 and/or functional system 508.

Communication module 710 can be configured to facilitate communication between building device 402*a*, building devices 402*b-d*, PoE source 404, and/or a network (e.g., the Internet) that may be provided by network device 406 as described with reference to FIG. 4. In this regard, communication module 710 can be configured to send and/or receive data. Communication module 710 can be configured to cause communication controller 514 to transmit network data. Further, communication module 710 can be configured to receive data from communication controller 514.

Building device 402*a* is shown to include power circuit 504 as described with reference to FIG. 6 and power injector 714. As previously described, power circuit 504 can be configured to receive power from power source 502 and power processing circuit 510, I/O 506, and/or functional system 508 via the power received from power source 502. Power circuit 504 is further shown to provide power to power injector 714. In some embodiments, power injector 714 can be a circuit configured to "inject" power into one of Ethernet port 704 and/or Ethernet port 706. This may supplement the PoE of the PoE source 404. In various embodiments, power injector 714 is configured to determine if a voltage measured at Ethernet interface 703 is below a predefined voltage. In response to determining that the voltage is below a predefined voltage, power injector 714 can be configured to inject power to supplement the PoE of the PoE source 404.

Ethernet interface 703 is shown to include Ethernet port 704 and Ethernet port 706. Ethernet port 704 can be configured to connect building device 402*b* to building device 402*a* via an Ethernet cable. Ethernet port 706 can be configured to connect PoE source 404 to building device 402*a* via an Ethernet cable.

Communication controller 514 is shown to include wake on demand controller 715. Wake on demand controller 715 may be a software component of communication controller 514 and/or may be a circuit and/or other processing circuit. Wake on demand controller 715 may be a software component of communication controller 514. In some embodiments, wake on demand controller 715 can be configured to receive network data from Ethernet interface 703. In response to determining that building device 402*a* has received data and/or otherwise needs to operate in a full power mode, wake on demand controller 715 can be configured to cause processing circuit 510 to operate in a high power mode. After processing circuit 510 has performed any actions necessary after being "woken up" by wake on demand controller 715, processing circuit 510 may return to a low power mode. In some embodiments, the communication subsystem 512 can be configured to operate in a low power mode. In response to the wake on demand controller 715 receiving data, the wake on demand controller 715 can be configured to causes the communication subsystem 512 to operate in a high power mode and process the received data (e.g., provide the processing circuit 510 with the received data).

Figure 7:
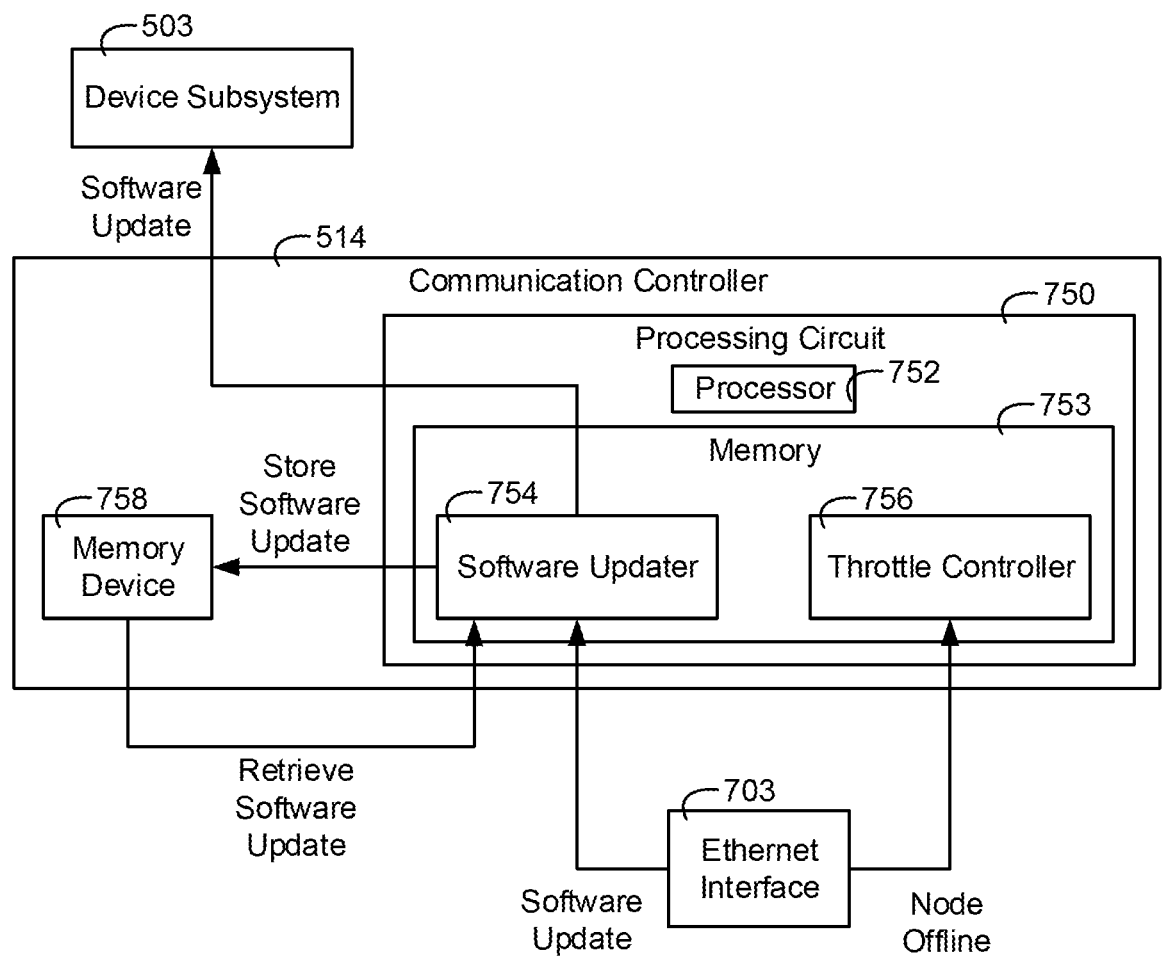
FIG. 7 is a block diagram of a communications controller of one of the building devices of FIG. 4, according to an exemplary embodiment.

Referring now to FIG. 7, communication controller 514 is shown in greater detail to include software update functionality and network throttle functionality, according to an exemplary embodiment. Communication controller 514 can include a processing circuit 750 and a memory device 758. Processing circuit 750 may be a processing circuit that is the same as and/or similar to processing circuit 510 as described with reference to FIGS. 5-6. Similarly, processor 752 of processing circuit 750 and memory 753 of processing circuit 750 may be the same as or similar to processing circuit 510 and memory 702 as described with reference to FIG. 6.

Memory device 758 can be a circuit component (e.g., a RAM module, a SDRAM, Flash, etc.) and/or any other kind of volatile or non-volatile memory. Memory device 758 may, in some embodiments, be the same as memory 753. In some embodiments, memory device 758 is the same type of memory device as memory 753. Memory device 758 can be configured to store a software update for building device 402a when building device 402a is offline, i.e., power source 502 is unavailable. In this regard, if a software update is delivered to building device 402a while power source 502 is offline, memory device 758 can store the software update and provide the software update to device subsystem 503 when device subsystem 503 comes back online. Although the functionality of memory device 758 is described with reference to software updates, the functionality can be applied to communication messages that may be received and temporarily stored in memory device 758 when device subsystem 503 is not active.

Memory 753 is shown to include a software updater 754 and a throttle controller 756. Software updater 754 and throttle controller 756 may be software modules, circuits, and/or any other computing component of processing circuit 750 or data element, script component, or code stored by memory 753. Software updater 754 can be configured to receive a software update from Ethernet interface 703. In some embodiments, the software update is sent to software updater 754 from a server connected to the Internet, a programming device connected to Ethernet interface 703, and/or any other high level controller connected to software updater 754 via Ethernet interface 703.

In response to receiving the software update from Ethernet interface 703, software updater 754 can determine whether the device subsystem 503 is offline or online. In some embodiments, software updater 754 may receive and/or determine an indication regarding whether power source 502 is powering building device 402a. In response to determining that device subsystem 503 is online, software updater 754 can provide device subsystem 503 with the software update (e.g., to processing circuit 510). In response to determining that device subsystem 503 is offline, software updater 754 can be configured to cause memory device 758 to store the software update. In response to device subsystem 503 coming back online, software updater 754 can be configured to retrieve the software update from memory device 758 and provide the software update to device subsystem 503 for installation. In response to receiving the software update, device subsystem 503 can be configured to install the update.

In some embodiments, not every building device of building devices 503 and 503b-d includes a memory device such as memory device 758. In this regard, one of the building devices may be a "master device" for performing updates in a network. For example, if communication controller 514 is part of a master building device, software updater 754 can receive a software update for one of the building devices. Software updater 754 can determine whether the building device to be updated is online or not. If the building device is online, software updater 754 may send the software update to the building device to be updated via Ethernet interface 703. If the building device to be updated is not online, software updater 754 can be configured to cause memory device 758 to store the software update. In response to determining that the building device to be updated is back online, software updater 754 can retrieve the software update from memory device 758 and send the software update to the building device to be updated via Ethernet interface 703. In response to receiving the software update from software updater 754, the building device to be updated can be configured to install the software update.

Throttle controller 756 can be configured to throttle communications that communication controller 514 sends and/or receives via Ethernet interface 703. Throttle controller 756 can adjust the rate at which the communication controller 514 receives data from Ethernet interface 703. Furthermore, throttle controller 756 can set a cap which adjusts the rate at which communication controller 514 can receive data. In some embodiments, throttle controller 756 can set a first predefined throttle rate and/or bandwidth cap to lower the amount of data communicated via building devices 402a-d. Throttle controller 756 may also set the throttle rate and/or bandwidth cap to second values, greater than the first values.

Throttle controller 756 can implement the second settings during normal operating conditions and/or throttle controller 756 can be configured to implement the first settings during abnormal operating conditions. Throttle controller 756 can be configured to detect whether the operating conditions are normal and abnormal and set the throttle rate and/or bandwidth cap appropriately. Throttle controller 756 can be configured to determine whether one of the building devices 402a-d has gone offline based on data received via Ethernet interface 703. In response to determining that a building device is offline, throttle controller 756 can cause communication controller 514 to operate at the first settings.

In some embodiments, throttle controller 756 can cause communication controller 514 and/or building device 402a to go into a sleep mode in response to determining that that one of building devices 402a-d is offline. In this regard, when one of building devices 402a-d goes offline, all of the building devices may go into the sleep mode. In the sleep mode, each device may perform only critical or mandatory functionality, e.g., communicate only specific forms of high priority or critical data. In some embodiments, in response to determining that one of building devices 402a-d is offline, throttle controller 756 can implement the low transmitting and/or receiving settings and cause communication controller 514 to perform power injecting. In some embodiments, before going into the sleep mode and/or implementing the first settings, throttle controller 756 can be configured to wait a predefined amount of time and determine, at the expiration of the predefined amount of time, whether the building device has come back online.

Figure 8:
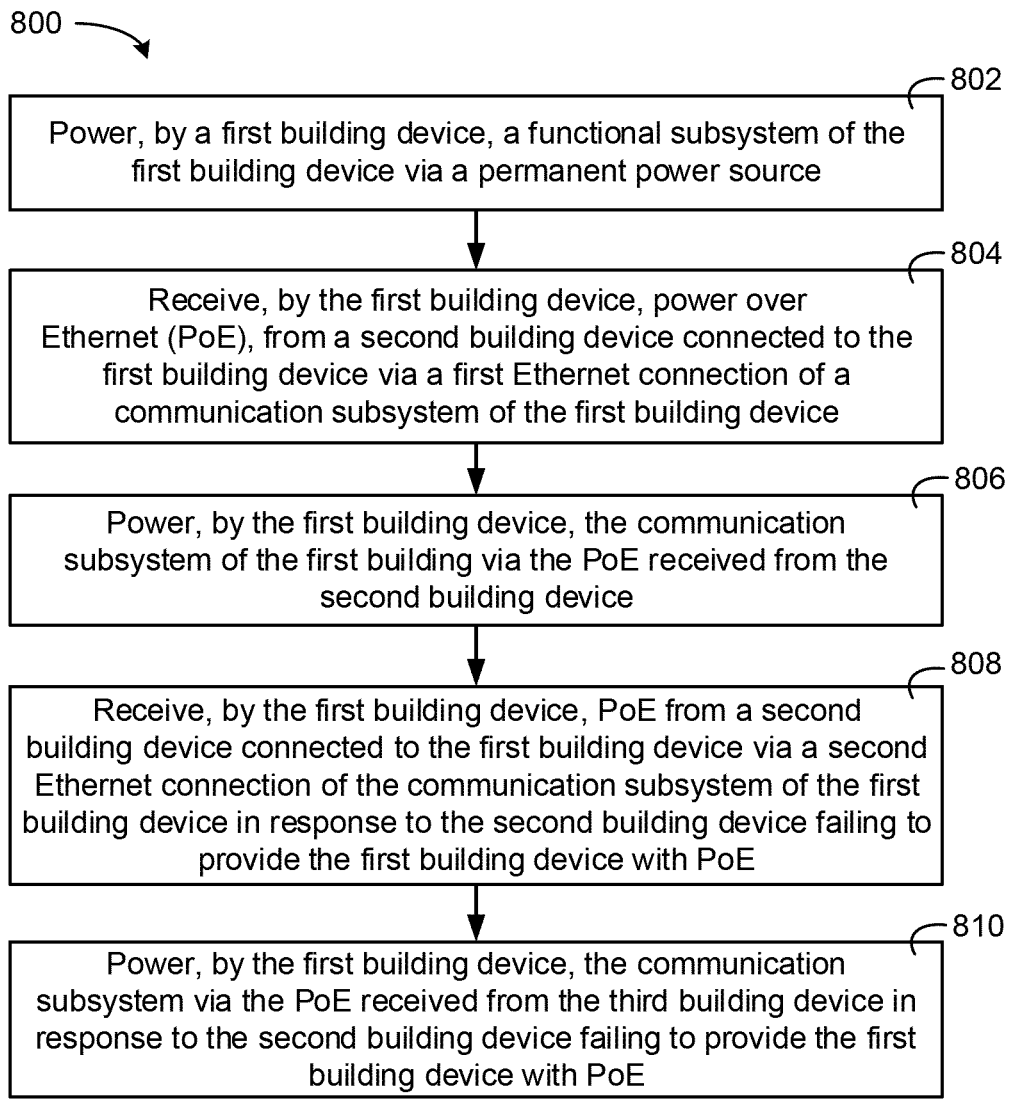
FIG. 8 is a flow diagram of a process for powering one of the building devices of FIG. 4 via PoE, according to an exemplary embodiment.

Referring now to FIG. 8, a process 800 is shown for powering one of building devices 402a-d via a permanent power source and/or based on PoE, according to an exemplary embodiment. Each of building devices 402a-d can be configured to perform the process 800. However, process 800 is described with reference to building device 402b.

In step 802, building device 402b can power a functional subsystem of building device 402b based on power received from a permanent power source. Building device 402b can receive power from power source 502b and power, via the power circuit 504b of the device subsystem 503b, device subsystem 503b so that device subsystem 503b can control various pieces of building equipment to control environmental conditions of building 10. For example, processing circuit 510b can control I/O 506b to control building equipment connected to device subsystem 503b. Furthermore, processing circuit 510b can control functional system 508b to control an environmental condition of building 10.

In step 804, building device 402b can receive PoE from a second building device connected to building device 402b via a first Ethernet connection of a communications subsystem of building device 402b. Building device 402b can receive power via an Ethernet port from building device 402b (e.g., receive PoE from PoE source 404 via building device 402a).

In step 806, building device 402b can power the communication subsystem of the first building device via the PoE received from PoE source 404. Communication subsystem 512*b* can power itself via PoE received from building device 402*a*. In some embodiments, PoE switch 518*b* is controlled by switch controller 516*b* such that communication subsystem 512*b*, or a power circuit of communications subsystem 512*b*, powers communication subsystem 512*b* via PoE received from PoE source 404.

In step 808, building device 402*a* can receive PoE from a third building device connected to building device 402*b* via a second Ethernet connection of a communications subsystem of building device 402*b* in response to the second building device failing to provide the first building device with PoE. Building device 402*b* can receive power via another Ethernet port from building device 402*c* (e.g., receive PoE from PoE source 404 via building device 402*c*, e.g., via building devices 402*c* and 402*c*).

In step 810, building device 402*b* can power the communications subsystem of the first building device via the PoE received from the third building device in response to the second building device failing to provide the first building device with PoE. Communication subsystem 512*b* can power itself via PoE received from building device 402*c*. In some embodiments, PoE switch 518*b* is controlled by switch controller 516*b* such that communication subsystem 512*b*, or a power circuit of communications subsystem 512*b*, powers communication subsystem 512*b* via PoE received via building device 402*c*.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A power over Ethernet (PoE) device system for a building, the system comprising:
   a plurality of building devices connected together and to a PoE source via a network, wherein the PoE source is configured to provide each of the plurality of building devices with PoE;
   wherein a first building device of the plurality of building devices comprises a communication subsystem circuit configured to:
      receive the PoE from the PoE source via one of the plurality of building devices;
      power the communication subsystem circuit using the PoE received from the PoE source via the one of the plurality of building devices;
      and communicate with the PoE source and the plurality of building devices via the network;
   wherein the first building device comprises a functional subsystem circuit configured to:
      power the functional subsystem circuit using power received from a permanent power source of the building;
      control an environmental condition of the building using the power received from the permanent power source of the building; and
      provide power from the permanent power source to the communication subsystem circuit in response to the PoE from the PoE source being insufficient to independently power the communication subsystem circuit.

2. The system of claim 1, wherein the network is an Ethernet daisy chain, wherein the plurality of building devices are connected to the PoE source via the Ethernet daisy chain.

3. The system of claim 1, wherein the communication subsystem circuit comprises a memory device, wherein the communication subsystem circuit is configured to:
   receive a software update for the first building device via the network;
   store the software update in the memory device of the communication subsystem circuit in response to determining that the functional subsystem circuit is not active due to the permanent power source failing to power the functional subsystem circuit;

retrieve the software update from the memory device of the communication subsystem circuit in response to determining that the functional subsystem circuit is active; and provide, in response to determining that the functional subsystem circuit is active, the retrieved software update to the functional subsystem circuit for the functional subsystem circuit to install.

4. The system of claim 1, wherein the communication subsystem circuit comprises a memory device, wherein the communication subsystem circuit is configured to:
receive a software update for the one of the plurality of building devices via the network;
store the software update in the memory device of the communication subsystem circuit in response to determining that a functional subsystem circuit of the one of the plurality of building devices is not active due to another permanent power source failing to power a functional subsystem circuit of the one of the plurality of building devices;
retrieve the software update from the memory device of the communication subsystem circuit in response to determining that the functional subsystem circuit of the one of the plurality of building devices is active; and
communicate, in response to determining that the functional subsystem circuit of the one of the plurality of building devices is active, the retrieved software update via the network to the one of the plurality of building devices to install via the functional subsystem circuit of the one of the plurality of building devices.

5. The system of claim 1, wherein the communication subsystem circuit is configured to:
transmit or receive data via the network based on a first communication setting;
determine that the one of the plurality of building devices is not active; and
in response to determining that the one of the plurality of building devices is not active, transmit or receive data via the network based on a second communication setting, wherein the second communication setting causes the communication subsystem circuit to transmit or receive data via the network at rates less than rates that the communication subsystem circuit is configured to transmit or receive data via the network based on the first communication setting.

6. The system of claim 1, wherein each of the plurality of building devices comprise a functional subsystem circuit configured to control the environmental condition of the building, wherein each functional subsystem circuit is configured to be powered using a particular permanent power source;
wherein each of the plurality of building devices comprises a communication subsystem circuit, wherein each communication subsystem circuit is configured to:
receive the PoE from the PoE source; and
power the communication subsystem circuit using the PoE received from the PoE source.

7. The system of claim 6, wherein the functional subsystem circuits of the plurality of building devices are configured to collectively draw more power than a maximum power amount that the PoE source is capable of providing to the plurality of building devices; and
wherein the communication subsystem circuits of the plurality of building devices are configured to collectively draw less than the maximum power amount.

8. The system of claim 6, wherein the functional subsystem circuits of the plurality of building devices are configured to each draw more power than a maximum power amount that the PoE source is capable of providing to the plurality of building devices; and
wherein the communication subsystem circuits of the plurality of building devices are configured to each draw less than the maximum power amount.

9. The system of claim 1, wherein the network is a ring network, wherein the plurality of building devices and the PoE source are connected in the ring network;
wherein a second building device of the plurality of building devices is directly connected to the PoE source via the network and is connected to the first building device via the network;
wherein a third building device of the plurality of building devices is directly connected to the PoE source via the network and is connected to the first building device via the network.

10. The system of claim 9, wherein the communication subsystem circuit of the first building device is configured to:
receive the PoE from the PoE source via the second building device;
power the communication subsystem circuit using the PoE received from the PoE source via the second building device;
receive the PoE from the PoE source via the third building device in response to determining that the first building device has not received the PoE from the PoE source via the first building device; and
power the communication subsystem circuit using the PoE received from the PoE source via the third building device in response to determining that the first building device has not received the PoE from the PoE source via the second building device.

11. The system of claim 10, wherein the first building device comprises a PoE switch circuit;
wherein the communication subsystem circuit is configured to cause the communication subsystem circuit to be powered using power received from the PoE source via the second building device or using power received from the PoE source via the third building device by controlling the PoE switch circuit.

12. A first building device of a power over Ethernet (PoE) system comprising:
a communication subsystem circuit configured to:
receive PoE from a PoE source via one of a plurality of building devices of a network, wherein the PoE source is configured to provide each of the plurality of building devices with PoE, wherein the plurality of building devices are connected to the PoE source via the network;
power the communication subsystem circuit using the PoE received from the PoE source via the one of the plurality of building devices; and communicate with the PoE source and the plurality of building devices via the network;
a functional subsystem circuit configured to:
power the functional subsystem circuit using power received from a permanent power source of the building;
control an environmental condition of the building, using the power received from the permanent power source of the building; and provide power from the permanent power source to the communication subsystem circuit in response to the PoE from the PoE source being insufficient to independently power the communication subsystem circuit.

13. The first building device of claim 12, wherein the network is an Ethernet daisy chain, wherein the plurality of building devices and the first building device are connected to the PoE source via the Ethernet daisy chain.

14. The first building device of claim 12, wherein the communication subsystem circuit comprises a memory device, wherein the communication subsystem circuit is configured to:
   receive a software update for the first building device via the network;
   store the software update in the memory device of the communication subsystem circuit in response to determining that the functional subsystem circuit is not active due to the permanent power source failing to power the functional subsystem circuit;
   retrieve the software update from the memory device of the communication subsystem circuit in response to determining that the functional subsystem circuit is active; and
   provide, in response to determining that the functional subsystem circuit is active, the retrieved software update to the functional subsystem circuit for the functional subsystem circuit to install.

15. The first building device of claim 12, wherein the communication subsystem circuit comprises a memory device, wherein the communication subsystem circuit is configured to:
   receive a software update for the one of the plurality of building devices via the network;
   store the software update in the memory device of the communication subsystem circuit in response to determining that a functional subsystem circuit of the one of the plurality of building devices is not active due to another permanent power source failing to power a functional subsystem circuit of the one of the plurality of building devices;
   retrieve the software update from the memory device of the communication subsystem circuit in response to determining that the functional subsystem circuit of the one of the plurality of building devices is active; and
   communicate, in response to determining that the functional subsystem circuit of the one of the plurality of building devices is active, the retrieved software update via the network to the one of the plurality of building devices to install via the functional subsystem circuit of the one of the plurality of building devices.

16. The first building device of claim 12, wherein the network is a ring network, wherein the plurality of building devices and the PoE source are connected in the ring network;
   wherein a second building device of the plurality of building devices is directly connected to the PoE source via the ring network and is connected to the first building device via the ring network;
   wherein a third building device is directly connected to the PoE source via the network and is connected to the first building device via the ring network.

17. The first building device of claim 16, wherein the communication subsystem circuit of the first building device is configured to:
   receive the PoE from the PoE source via the second building device;
   power the communication subsystem circuit using the PoE received from the PoE source via the second building device;
   receive the PoE from the PoE source via the third building device in response to determining that the first building device has not received the PoE from the PoE source via the first building device; and
   power the communication subsystem circuit using the PoE received from the PoE source via the third building device in response to determining that the first building device has not received the PoE from the PoE source via the second building device.

18. The first building device of claim 17, wherein the communication subsystem circuit comprises a PoE switch circuit;
   wherein the communication subsystem circuit is configured to cause the communication subsystem circuit to be powered using power received from the PoE source via the second building device or using power received from the PoE source via the third building device by controlling the PoE switch circuit.

19. A method for controlling a first building device of a power over Ethernet (PoE) system of a building comprising:
   receiving, by a communication subsystem circuit of the first building device, PoE from a PoE source via one of a plurality of building devices of a network, wherein the PoE source is configured to provide each of the plurality of building devices with PoE, wherein the plurality of building devices are connected to the PoE source via the network;
   powering, by the communication subsystem circuit, the communication subsystem circuit using the PoE of the PoE source received from the PoE source via the one of the plurality of building devices;
   communicating, by the communication subsystem circuit, with the PoE source and the plurality of building devices via the network;
   powering, by a functional subsystem circuit of the first building device, the functional subsystem circuit using power received from a permanent power source of the building;
   controlling, by the functional subsystem circuit, an environmental condition of the building using the power received from the permanent power source of the building;
   providing power from the permanent power source to the communication subsystem circuit in response to the PoE from the PoE source being insufficient to independently power the communication subsystem circuit.

20. The method of claim 19, wherein the network is a ring network, wherein the plurality of building devices and the PoE source are connected in the ring network;
   wherein a second building device of the plurality of building devices is directly connected to the PoE source via the ring network and is connected to the first building device via the ring network;
   wherein a third building device is directly connected to the PoE source via the network and is connected to the first building device via the ring network;
   wherein the method further comprises:
      receiving, by the communication subsystem circuit, the PoE from the PoE source via the second building device;
      powering, by the communication subsystem circuit, the communication subsystem circuit using the PoE received from the PoE source via the second building device;
      receiving, by the communication subsystem circuit, the PoE from the PoE source via the third building device in response to determining that the first building device has not received the PoE from the PoE source via the first building device; and powering, by the communication subsystem circuit, the communication subsystem circuit using the PoE received from the PoE source via the third building device in response to determining that the first building device has not received the PoE from the PoE source via the second building device.

* * * * *